Aug. 10, 1926.
E. COFFMAN
1,595,857
STEERING AND PROPELLING APPARATUS FOR VELOCIPEDES
Filed Sept. 9, 1925     2 Sheets-Sheet 1
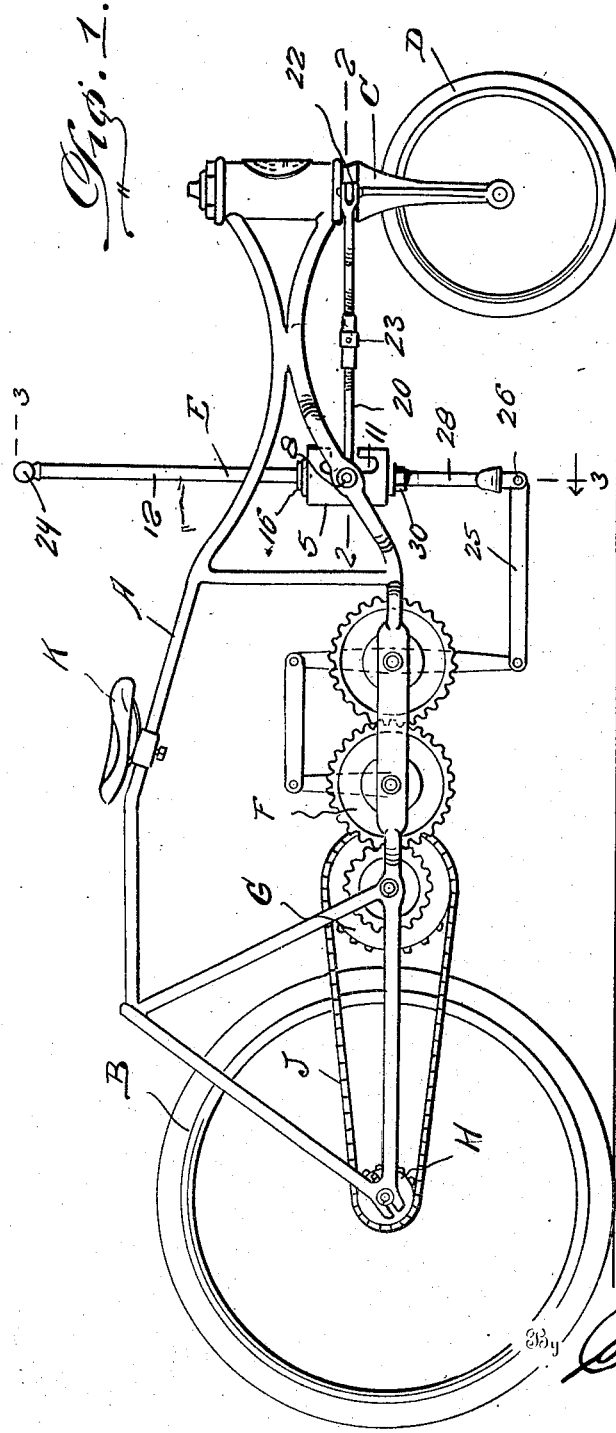
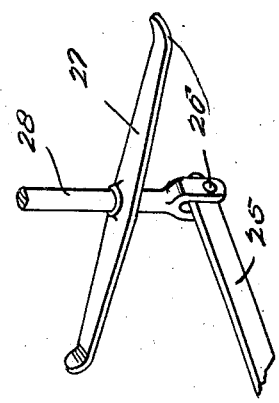
Inventor
Elwert Coffman,
By Clarence A. O'Brien
Attorney Aug. 10, 1926.
E. COFFMAN
1,595,857
STEERING AND PROPELLING APPARATUS FOR VELOCIPEDES
Filed Sept. 9, 1925     2 Sheets-Sheet 2
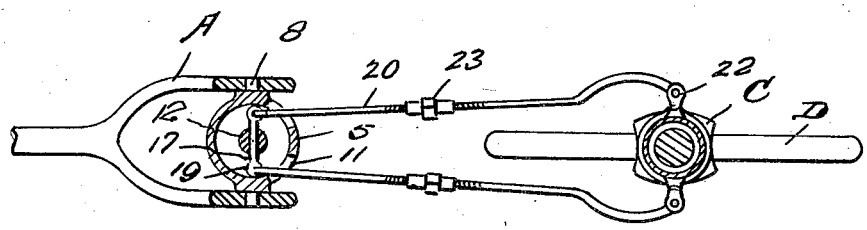
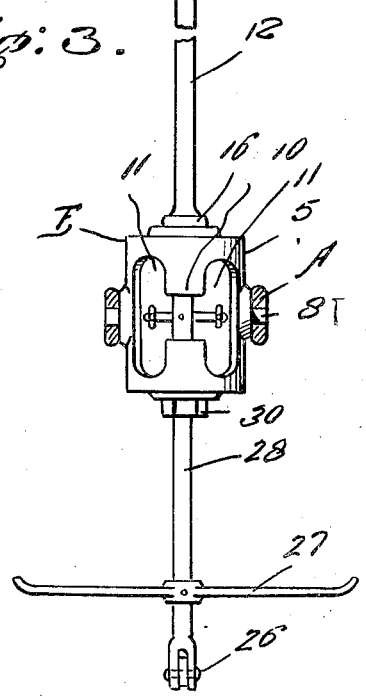
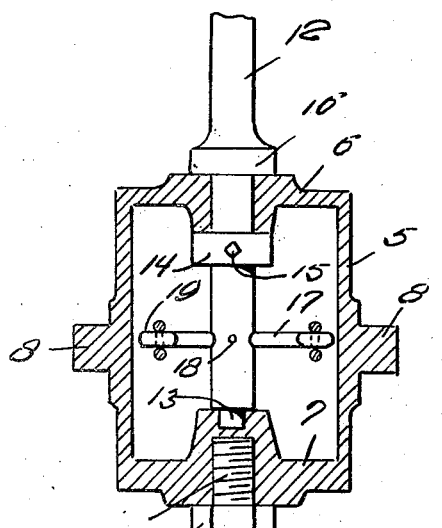
Inventor
Elwert Coffman
By Clarence A. O'Brien
Attorney Patented Aug. 10, 1926.

1,595,857

UNITED STATES PATENT OFFICE.

ELWERT COFFMAN, OF LORAIN, OHIO.

STEERING AND PROPELLING APPARATUS FOR VELOCIPEDES.

Application filed September 9, 1925. Serial No. 55,275.

The present invention relates to a steering and propelling apparatus for velocipedes such as bicycles, tricycles and the like, and aims generally to improve upon the structure shown in Letters Patent No. 1,549,854, for improvements in mechanical movements, issued to me on August 18, 1925.

The principal object of the invention is to provide an oscillating member for operating the mechanical movement shown in said Letters Patent for the purpose of propelling the velocipede and having a portion lever turnable and means associated therewith and with the dirigible wheels of the velocipede whereby the latter may be steered by the turning of the rotatable portion of the lever.

Another very important object of the invention is to provide a combined steering and propelling apparatus for velocipedes which is exceedingly simple in its construction, strong, durable, inexpensive to manufacture, efficient, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of a bicycle showing my improved features incorporated therein, Fig. 2 is a longitudinal section taken substantially on the line 2—2 of Fig. 1, Fig. 3 is a vertical section taken substantially on the line 3—3 of Fig. 1, Fig. 4 is a vertical section taken through the casing portion of the actuating lever, and Fig. 5 is a fragmentary detail perspective view showing the lower portion of said lever.

Referring to the drawing in detail, it will be seen that the letter A denotes the frame of a bicycle which is used to illustrate the practical embodiment of my invention, B the rear or drive wheel thereof, C the steering fork, D the front wheel mounted in the fork, and E the rocking or oscillating lever. The mechanical movement indicated generally by the letter F is identical with that shown in the Letters Patent mentioned in the statement of the invention, and needs no further detailed description herein except to state that this mechanical movement changes the oscillatory movement of the lever E to rotary movement of the sprocket G. Of course, a sprocket H is mounted on the rear wheel B and a chain J is trained over the sprockets G and H. The seat K is adjustably mounted on the top rail or bar of the frame A. With the exception of the oscillating lever E the other elements enumerated above are old and well known in this art at this time and have been given merely to exemplify the utility of the novel structure of said oscillating lever E.

Referring now in detail to said oscillating lever E, it will be seen that 5 designates a cylindrical casing having its upper end closed as at 6 and its lower end closed as at 7. Trunnions 8 extend diametrically outwardly from the casing 5 and are journaled in portions of the frame as is indicated to advantage in Figs. 1 and 3. The casing at its front side is provided with an opening 10 which has its ends vertically enlarged as indicated at 11.

A bar 12 extends through the top 6 for rotation and has its lower end journaled in the bottom 7 as indicated specifically at 13. A collar 14 is fixed on the bar 12 within the casing for engaging the inside of the top 6 thereby holding this bar in engagement with the casing. The collar 14 is held in place on the bar 12 by means of a set screw 15 or in any other equivalent device. An annular shoulder 16 is formed on the bar 12 and engages the upper or outside surface of the top 6.

A rod 17 extends through a portion of the bar 12 within the casing 5 and is held in place by a pin 18 or the equivalent. The ends of the rod 12 are in the form of eyes 19 with which are engaged the ends of adjustable links 20, the other ends of which are pivotally engaged with ears 22 projecting from the fork C. The links 20 are formed in sections coupled together by turn buckles 23 whereby the length of the links may be varied for obvious purposes. These links 20, of course, extend through the enlarged ends 11 of the opening 10.

It is to be noted, also, that the rod 17 is alined with the trunnions 8 so that the rocking or oscillating of the lever 12 does not effect the steering of the vehicle. A handle 24 is provided on the upper end of the bar 12 and by turning the same rotary motion may be imparted to said bar 12, thereby steering the fork C, through the intermediacy of the rod 17 and the links 20. The oscillation of the lever E, of course, reciprocates the link 25 pivotally engaged as at 26 with the lower end of the lever E and oppositely associated with the mechanical movement F heretofore referred to.

A foot bar 27 is engaged on the lower end of the lever E so that the lever may be rocked by the legs of an operator when desired. It is to be noted that the lower end of the lever is in the form of a bar 28 threaded at its upper end into the bottom 7 as is indicated at 29, a lock nut 30 being associated therewith.

It is thought that the construction, operation, and advantages of the invention will now be clearly understood without a more detailed description thereof. The present embodiment of the invention has been disclosed in detail merely by way of example since in actual practice it attains the features of advantage enumerated as desirable in the statement of the invention and the above description.

It will be apparent that numerous changes in the details of construction, and in the combination and arrangement of parts may be resorted to without departing from the spirit or scope of the invention as hereinafter claimed, and without sacrificing any of its advantages. It is particularly desired to point out that a sprocket and chain mechanism could be substituted for the rod 17, links 20 and associated features. In fact any suitable transmitting gearing could be used. My invention lies particularly in the lever E as will be pointed out in the appended claims.

Having thus described my invention, what I claim as new is:—

1. A lever of the class described including, in combination, a casing, a bar rotatably mounted thru one end of the casing, a bar mounted to extend from the other end of the casing coaxially with the first mentioned bar, take-off means associated with the first mentioned bar and located within the casing.

2. A lever of the class described including in combination, a casing, a bar rotatably mounted through one end of the casing, a bar mounted to extend from the other end of the casing coaxially with the first mentioned bar, take-off means associated with the first mentioned bar and located within the casing, and means for oscillatorily mounting the casing.

3. In combination, a frame, a drive wheel on the frame, a steering wheel on the frame, a casing rockably mounted in the frame, a bar rotatably mounted in the casing for imparting oscillation to said casing, a second bar extending from the casing, means between the second bar and the drive wheel to change the oscillatory movement of said second bar into rotary movement of said drive wheel, a rod extending through the first mentioned bar coaxially with the axis of oscillation of the casing, links attached to said rod and operatively connected with the steering wheel.

4. In a vehicle, a frame, a drive wheel and a dirigible wheel associated with the frame, a cylindrical casing having its ends closed, a pair of trunnions projecting outwardly and diametrically from the outer cylindrical surface of the casing and journaled in the frame to provide a horizontal transverse axis for the casing in the frame, the cylindrical wall at the front of the casing being provided with an opening, a bar rotatably piercing an opening in the top end of the casing and journaled in the bottom thereof, a collar on the bar within the casing and bearing against the inside of the top end of said casing to maintain the bar in place in respect to said casing, a rod extending through the bar within the casing coaxially with the trunnions, links connecting the ends of the rod with the dirigible wheel, said links extending through the opening in the side wall of the casing, a second bar engaged in the lower end of the casing and extending downwardly therefrom, and operating means for the drive wheel connected with said second bar.

In testimony whereof I affix my signature.

ELWERT COFFMAN.